(12) United States Patent
Van Egeren et al.

(10) Patent No.: US 7,937,356 B2
(45) Date of Patent: May 3, 2011

(54) APPARATUS, AND ASSOCIATED METHOD, FOR ASSESSING VIABILITY OF COMMUNICATION SYSTEM ARRANGEMENT TRANSFORMATION

(75) Inventors: Yea-Yuan (Beth) Van Egeren, Auburn Hills, MI (US); Joe Cunnings, Bloomfield Hills, MI (US); Dale Chalfant, Chatsworth, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 914 days.

(21) Appl. No.: 11/560,389

(22) Filed: Nov. 16, 2006

(65) Prior Publication Data
US 2007/0203684 A1    Aug. 30, 2007

Related U.S. Application Data

(60) Provisional application No. 60/777,624, filed on Feb. 28, 2006.

(51) Int. Cl.
*G06F 17/00*    (2006.01)
*G06N 5/02*    (2006.01)

(52) U.S. Cl. ......................................... 706/50
(58) Field of Classification Search .................. None
See application file for complete search history.

(56) References Cited

OTHER PUBLICATIONS

'The grid: blueprint for a new computing infrastructure': Foster, 1999, Morgan Kaufmann.*
'Resource management for rapid application turnaround on enterprise desktop grids': Kondo, 2004, IEEE, 0-7695-2153-3.*
Crichlow, 'An introduction to distributed and parallel computing', Prentice Hall, 1988.*

* cited by examiner

*Primary Examiner* — Donald Sparks
*Assistant Examiner* — Peter Coughlan

(57) ABSTRACT

Apparatus, and an associated method, for determining viability of transformation of a conventional computer system arrangement into a virtualized arrangement. A virtualization engine is provided that includes an assessor and a scorer. The assessor carries out an assessment process, such as a system assessment, a component assessment, and a cost assessment that assesses the viability of the transformation. And, a scorer provides a quantifiable score of the assessment results. The score is used in the decision-making process to decide whether to transform the arrangement into the virtualized arrangement.

19 Claims, 10 Drawing Sheets

APPARATUS, AND ASSOCIATED METHOD, FOR ASSESSING VIABILITY OF COMMUNICATION SYSTEM ARRANGEMENT TRANSFORMATION

CROSS-REFERENCE TO RELATED APPLICATIONS

The present invention claims priority of the provisional patent application of application Ser. No. 60/777,624, filed Feb. 28, 2006, the contents of which are incorporated herein by reference.

The present invention relates generally to a manner by which to facilitate transformation of a conventional computer system arrangement into a virtualized computer system arrangement that is configured using a virtualization technology. More particularly, the present invention relates to apparatus, and an associated method, that assesses viability of the transformation of the conventional computer system arrangement to the virtualized arrangement.

A quantifiable and repeatable assessment that scores, or otherwise identifies, the viability of the transformation is provided. A business, or other, entity that is contemplating migration from a conventional computer system arrangement to a virtualized, e.g., a horizontally-scaled or grid, arrangement is provided with a tool that indicates whether the contemplated migration is viable.

BACKGROUND OF THE INVENTION

Many business, and other, entities make use of computer systems to provide many essential services and tasks, needed both for the internal entity operations as well as operations with respect to customers or clients of the entity. With decreasing computer and processing costs and increasing availability of new applications and services by way of computer systems, reliance upon computer systems shall likely increase.

When the business, or other, entity is large, the organization is likely to have a large number of computer workstations, configured in any of various manners, but generally in a conventional hosting configuration.

Advancements in computer-related technologies that provide for the decreasing costs and increasing availability of applications and services are, in part, permitted as a result of increasing processing and storage capabilities of computer devices. Many such computer devices, workstations and the like, have significant processing and storage capabilities that are under-utilized in conventional hosting configurations and arrangements.

Various schemes have been developed by which better to utilize the capabilities of the computer devices when networked, or otherwise connected, together. In one such scheme, so-called virtualization of the computer devices is implemented. And, when so-configured, the arrangement forms a virtualized environment.

In one exemplary virtualized arrangement, horizontal scaling is utilized. The functionality and processing capability of a low- and mid-tiered computer server, such as a Sun Microsystems Solaris 10™ T2000 server is, for example, used together with a zones functionality in which a computer server is divided into many zones, thereby permitting many applications to reside at the same computer server while appearing as though each application is running on its own server. That is to say, a server is divided into zones in which each zone acts as its own server, available to run an application tier. The aforementioned Solaris 10™ server is able to support up to a maximum of 8,192 zones. And, every server has a zone for each application. Use of horizontal scaling is particularly advantageous for transactional, real-time applications.

In another exemplary virtualization scheme, a grid computing scheme is utilized. In a grid computing scheme, batch related transactions are parsed so that the parsed pieces are able to be sent and executed in parallel on multiple servers. Once executed, parsed results are returned and combined. When implemented, e.g., by a Sun Microsystems N1™ Grid software, a grid engine is capable of executing a batch application. Server availability and readiness to execute an application piece is determined by agents that run on a server. By operating the batch job in parallel across multiple servers, the application is completed more quickly than if performed upon a single device.

In either of these exemplary virtualization schemes, as well as others, arrangement of a communication system pursuant to the selected virtualization scheme, provides for more efficient utilization of computer resources.

An entity that utilizes an existing, conventional computer system arrangement might well contemplate migration of the system to a virtualized arrangement, such as the aforementioned horizontally-scaled arrangement or grid arrangement. The viability of such a migration, however, is dependent upon the resources, e.g., costs associated with the migration or the time required to migrate to the new arrangement. To date, there generally has not been an adequate manner by which to quantify the viability of such a migration.

If a manner could be provided by which quantitatively to assess the viability of transformation of a conventional communication system arrangement into a virtualized communication system arrangement, better-informed decision of whether to migrate to the virtualized arrangement can be made.

It is in light of this background information related to computer system arrangements that the significant improvements of the present invention have evolved.

SUMMARY OF THE INVENTION

The present invention, accordingly, advantageously provides apparatus, and an associated method, by which to facilitate transformation of a conventional computer system arrangement into a virtualized computer system arrangement that is configured using a virtualization technology.

Through operation of an embodiment of the present invention, a manner is provided by which to assess viability of the transformation of the conventional computer system arrangement to the virtualized arrangement.

In one aspect of the present invention, the viability of the transformation is identified by a quantifiable, and repeatable, assessment. When a business, or other, entity contemplates migration from a conventional computer system arrangement to a virtualized arrangement, the assessment indicates whether the contemplated migration is viable.

In another aspect of the present invention, an assessment is performed responsive to various indicia pertaining to the configuration of the existing computer system arrangement. A system assessment is performed to provide an indication of whether the system is amenable for transformation into a virtualized arrangement. And, if so, the adoption period expected to be required in which to transform the computer system arrangement.

In another aspect of the present invention, a component assessment is further performed. The component assessment makes use of information collected and formed pursuant to the system assessment and provides an assessment on a component basis. The component assessment provides an indication, e.g., of virtual hardware and other resource requirements of the existing computer system arrangement and expected, needed counterparts in a virtualized arrangement.

In another aspect of the present invention, a cost assessment is further provided. The cost assessment provides an indication of the expected costs required to transform the arrangement to the virtualized scheme.

In a further aspect of the present invention, an optimization process of the assessment is further provided. The optimization process utilizes results of assessment operations and compares the results with expected results. The optimization process is configured in a feedback arrangement and its use improves the assessment operations.

In another aspect of the present invention, a score quantizer quantizes the assessments, thereby to provide a quantified result representative of the viability of the transformation of the computer system arrangement to a virtualized arrangement. The quantified score is usable pursuant to making of a decision relative to transformation of the computer system arrangement into the virtualized form.

Virtualization of the computer system arrangement is definable in any of various manners including, e.g., a horizontal scaling arrangement and a grid-computing arrangement. Either of such virtualization arrangements, as well as others, provide for more efficient computer system utilization relative to conventional posting arrangements. By providing the quantified score representative of the assessment results, a decision maker at an entity that is considering transformation of an existing computer system arrangement into a virtualized arrangement is provided with a straightforward, and easily comparable, value to facilitate the making of the decision of whether to transform the existing computer system arrangement.

A virtualization engine is thereby provided that generates a score representative of the transformation viability of a transformation of an existing computer system arrangement into a virtualized arrangement. Inputs to the virtualization engine include, e.g., an application profile, surveys, indicia of the as-is architecture of the computer system, average and peak resource utilizations, timing of key events, an indication of whether the existing arrangement is in a standardized environment, etc. Once the input indicia is provided, an assessment is made of the transformation viability. The assessment first makes assessment of the system in its entirety, then on a component basis, and then on a basis of expected costs. And, responsive to the performed assessments, a scorer of the virtualization engine generates a quantified score that, in one implementation, is dimensioned in terms of virtualization, grid, and cost. In whatsoever quantification, the score provides an indication of the viability of the transformation. And, a decision maker is able to make use of the score to facilitate a decision as to whether to transform the computer system arrangement.

Through utilization of the virtualization engine, a mechanism is provided that assesses virtualization viabilities and whose use permits acceleration of the deployment of virtualization technologies. The virtualization engine provides an adaptable, yet repeatable, mechanism by which accurately to assess risks as well as financial and technical viability of transformation of an application to a virtualized environment. The assessor, and assessment procedures carried out by the virtualization engine, are adaptable, expandable to provide for assessment of other virtualization technologies as well as altering assessment criteria and procedures.

In these and other aspects, therefore, apparatus, and an associated method, is provided for facilitating transformation of an existing computer system arrangement into a virtualized computer system arrangement. An assessor is adapted to receive indication of the existing computer system arrangement. The assessor is configured to assess the viability of the transformation into the virtualized computer system arrangement. A score quantizer is adapted to receive indication of assessment made by the assessor. The quantizer is configured to form a quantized score representative of the assessment. The quantized score is usable in selection of whether to transform the existing computer system arrangement into the virtualized computer system arrangement.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
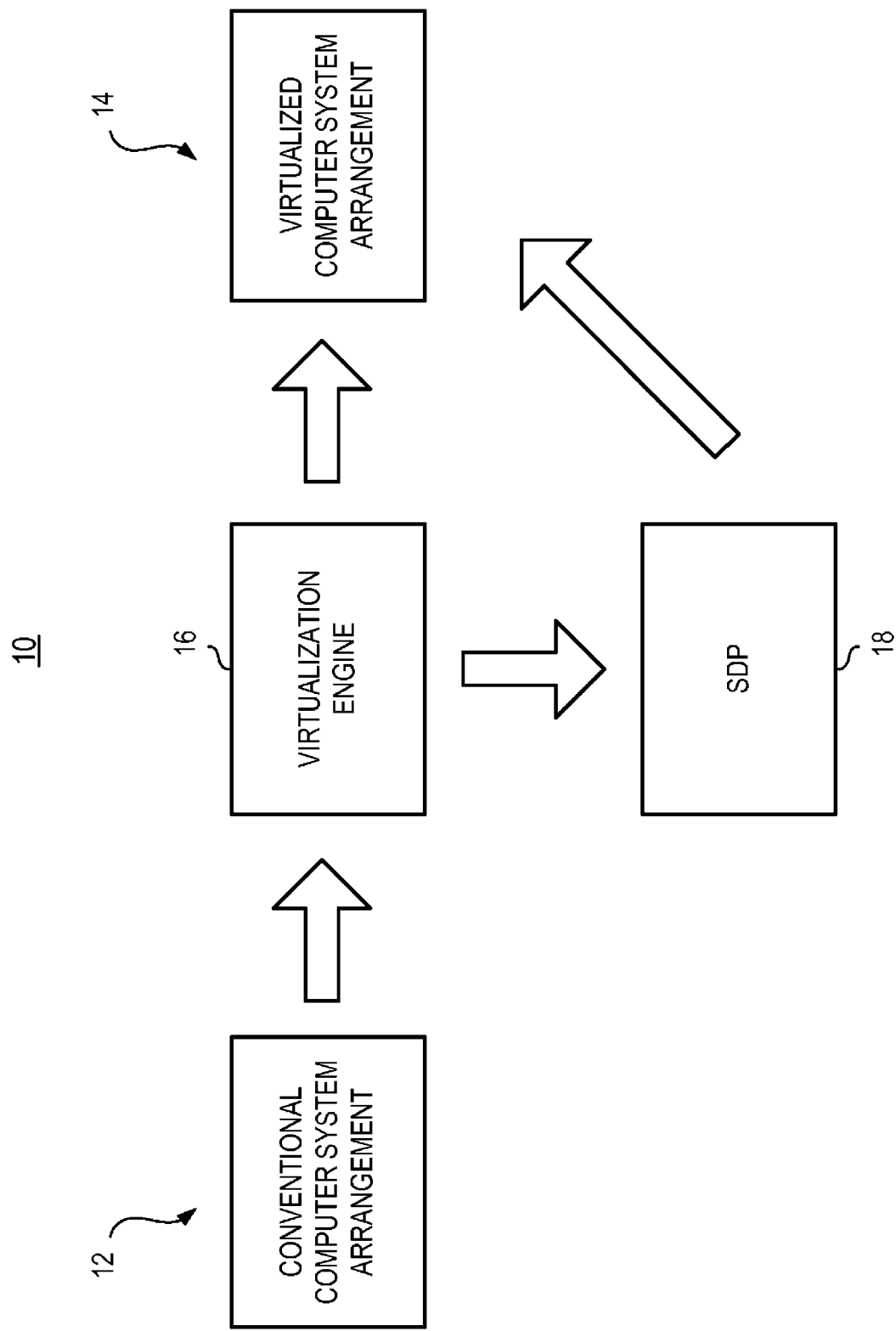
FIG. 1 illustrates a pictorial representation of the transformation whose assessment of the viability of its effectuation is assessed pursuant to operation of an embodiment of the present invention.

Referring first to FIG. 1, a representation, shown generally at 10, of both a conventional, computer system arrangement 12, and a virtualized, computer system arrangement 14, is shown. The conventional computer system arrangement forms a conventional hosting arrangement, and the virtualized computer system arrangement is represented by a scheme in which processing, and other resources, are balanced throughout a network of computer stations.

A virtualization engine 16 of an embodiment of the present invention is positioned between the conventional arrangement and the virtualized arrangement to represent the use of the virtualization engine to assess the viability of transformation of the conventional computer system arrangement into the virtualized arrangement. Through operation of the virtualization engine 16, the assessment is made, and, if appropriate, changes are prioritized, as represented in the System Development Process (SDP) 18 so that the computer system applications are employed in a logical, and an appropriate, manner pursuant to the transformation into the virtualized arrangement.

FIG. 2 again illustrates the virtualization engine 16, here further representing the input indicia and the output values generated pursuant to operation of the virtualization engine. The virtualization engine performs assessments of the transformation viability of the computer system arrangement into the virtualized arrangement and provides output values that quantize the assessment. Here, inputs to the virtualization engine include entity inputs, that is to say, information provided by the entity that operates the computer system whose transformation is under consideration, information pertaining to the system profile, system metric information, customer information, hosting vendor information, virtualization-engine operator information, (Configuration Management Knowledge Base (CMDB) information, Configuration Management Knowledge Base (CMKB) information, relearning tools, and work instructions. And, a feedback path 22 is also shown, representative of use of assessment results by which to improve the assessment engine operation.

As shall be described below, the virtualization engine includes an assessor 24 and a scorer 26 that form assessments and quantified scores, respectively, pursuant to operation of the virtualization engine. The assessor forms assessments, in terms of a system assessment, a component assessment, and a cost assessment. And, the scorer forms a quantified score that forms one of the output values generated by the virtualization engine. Here, further, an expected bill of materials (BOM) is also generated, as well as additional transformation estimates.

Figure 2:
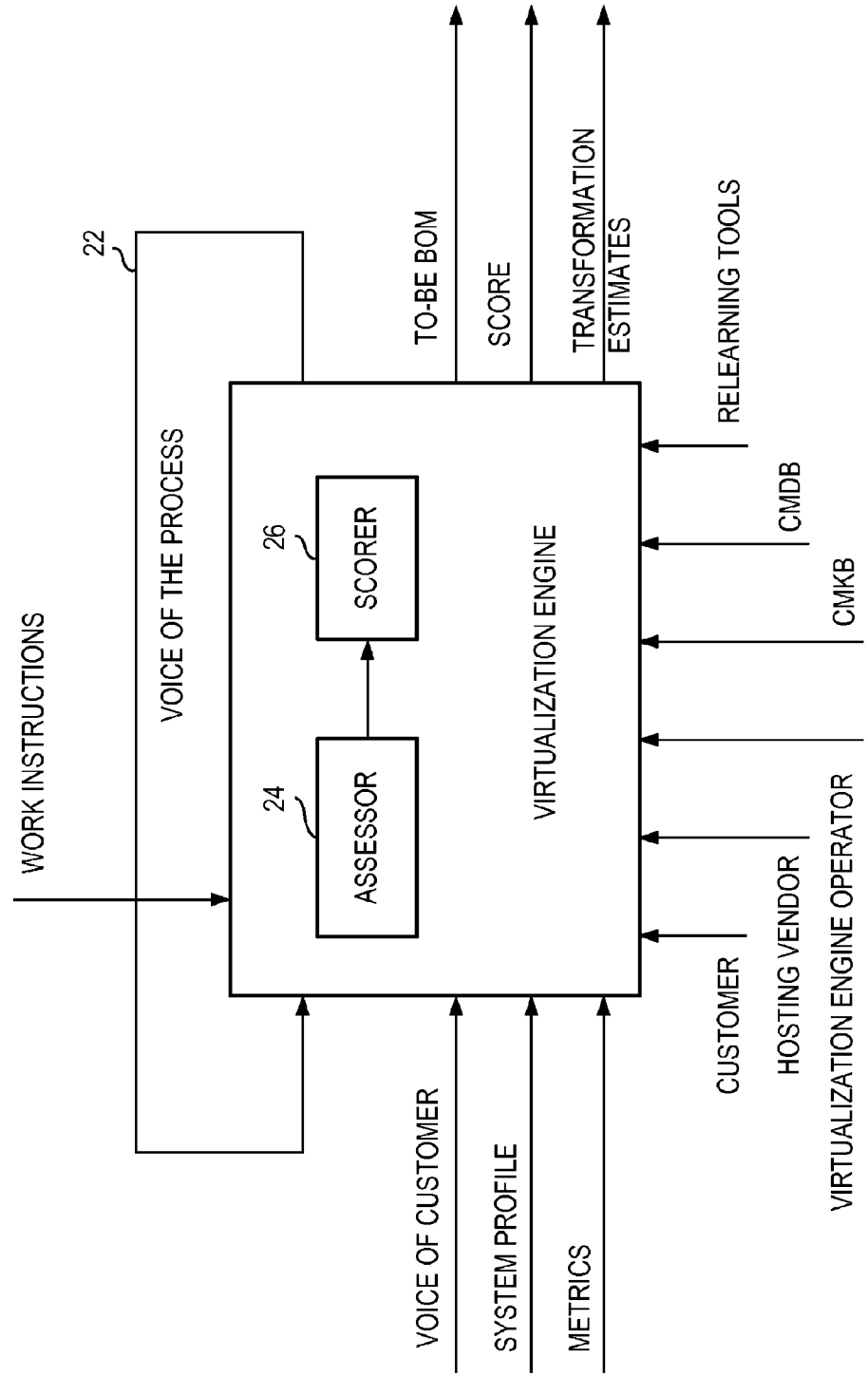
FIG. 2 illustrates a virtualization engine operable pursuant to an embodiment of the present invention.
Figure 3:
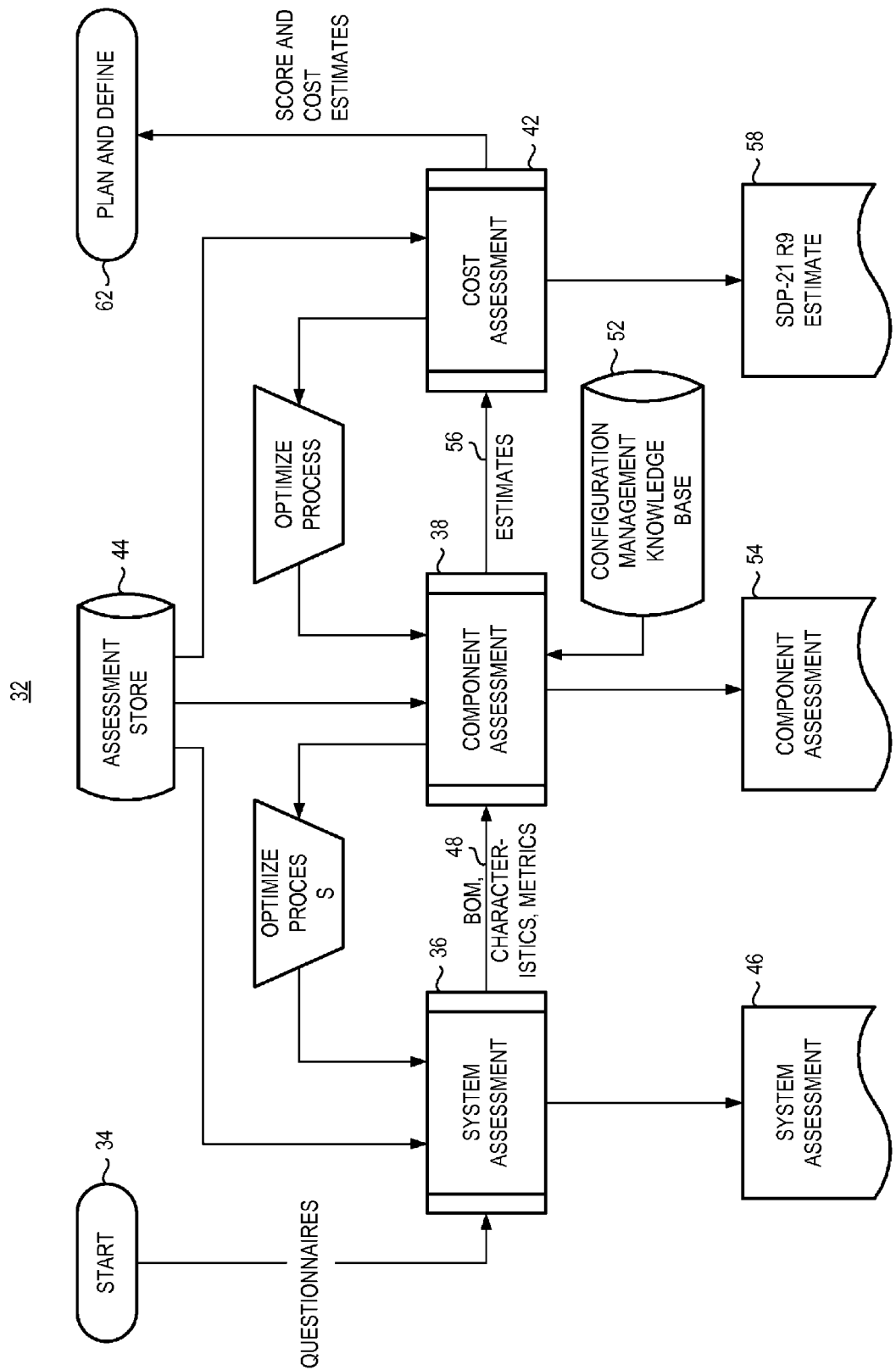
FIG. 3 illustrates a process representation of the operation of the assessor of an embodiment of the present invention.

FIG. 3 illustrates a process, shown generally at 32, representative of operation of the assessor 24 of the virtualization engine 16 shown in FIG. 2. Here, the three stages of the assessment process performed subsequent to start indicated by the start block 34, are shown. Namely, a system assessment stage 36, a component assessment stage 38, and a cost assessment stage 42 are shown. Input information, such as that provided to the assessor through questionnaire responses, as well as assessment store information sourced at the assessment store element 44, are provided to the system assessment stage. And, system assessment operations are performed to provide a system assessment 46. Additionally, system assessment results are provided, here indicated by way of the line 48, to the component assessment stage 38. A BOM (bill of material), as well as system characteristics and metrics, are provided to the component assessment stage. And, additionally, information sourced at the assessment store 44 is also provided to the component assessment stage. Additionally, in the exemplary implementation, information is further provided to the stage 38 by a configuration management knowledge base 52. The component assessment stage operates to perform a component assessment 54. And, estimates made by the component assessment stage are provided, here indicated by way of the lines 56, to the cost assessment stage 42. The cost assessment stage performs cost assessments and provides a cost estimate 58, here represented as an SDP estimate. And, the cost assessment is provided, together with a score formed by the scorer (shown in FIG. 2) for a plan and define stage 62.

Figure 4:
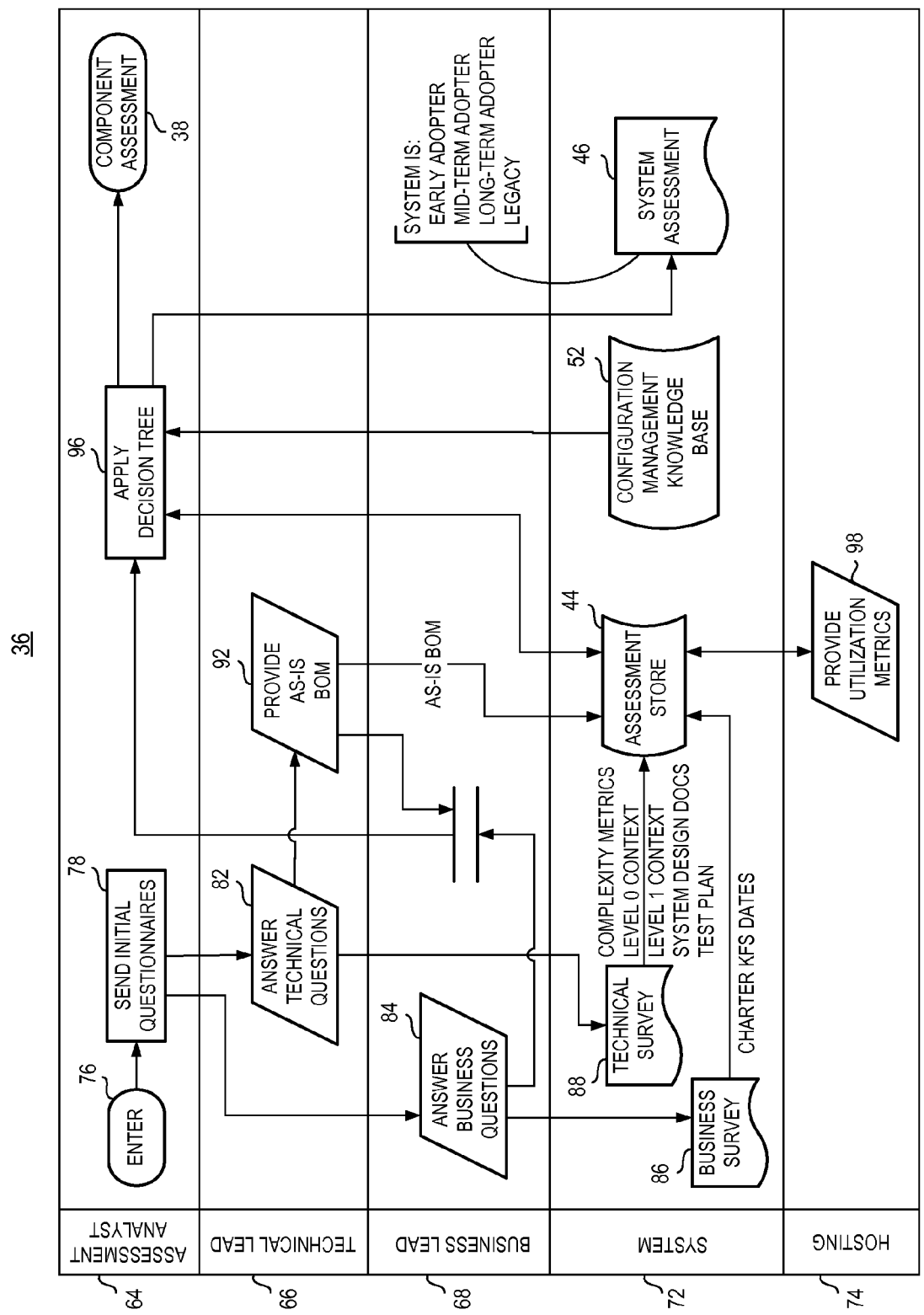
FIG. 4 illustrates a process representation of system assessment performed pursuant to operation of an embodiment of the present invention.

FIG. 4 illustrates the process of the system assessment stage 36 shown in FIG. 3. The process elements of the stage 36 shown in FIG. 4 are partitioned into levels performable by an assessment analyst 64, a technical lead 66, a business lead 68, a system entity 72, and a hosting entity 74.

Here, the system assessment stage commences subsequent to the enter block 76 when initial questionnaires are sent, indicated by the block 78. Then, paths are taken to the block 82, and to the block 84 whereat technical questions and business questions are answered, respectively. The business question answers are used pursuant to a business survey 86, and the technical question answers are used pursuant to a technical survey 88. Technical survey and business survey results are provided to the assessment store 44 available for subsequent retrieval and use.

The technical-question answer stage and the business-question answer stage leads to an as-is BOM (Bill of Material) stage 92. An as-is BOM is generated and also provided to the assessment store 44.

A path taken from the business-question answer stage extends to an apply decision tree stage 96. The assessment store 44 is accessible at the stage 96 as is also the configuration management knowledge base 52. The decision tree stage is provided as well as also the characteristics that are to be avoided from the configuration management knowledge base. Decision tree operations are performed, and the system assessment 46 is generated. A path is then taken to the component assessment stage 38. FIG. 4 further illustrates that the assessment store is further provided with utilization metrics from a hosting stage 98.

In the exemplary implementation, and as shown in FIGS. 3-4, the system assessment forms the first pass of the assessment operations performed by the assessor of the virtualization engine shown in FIG. 2.

Figure 5:
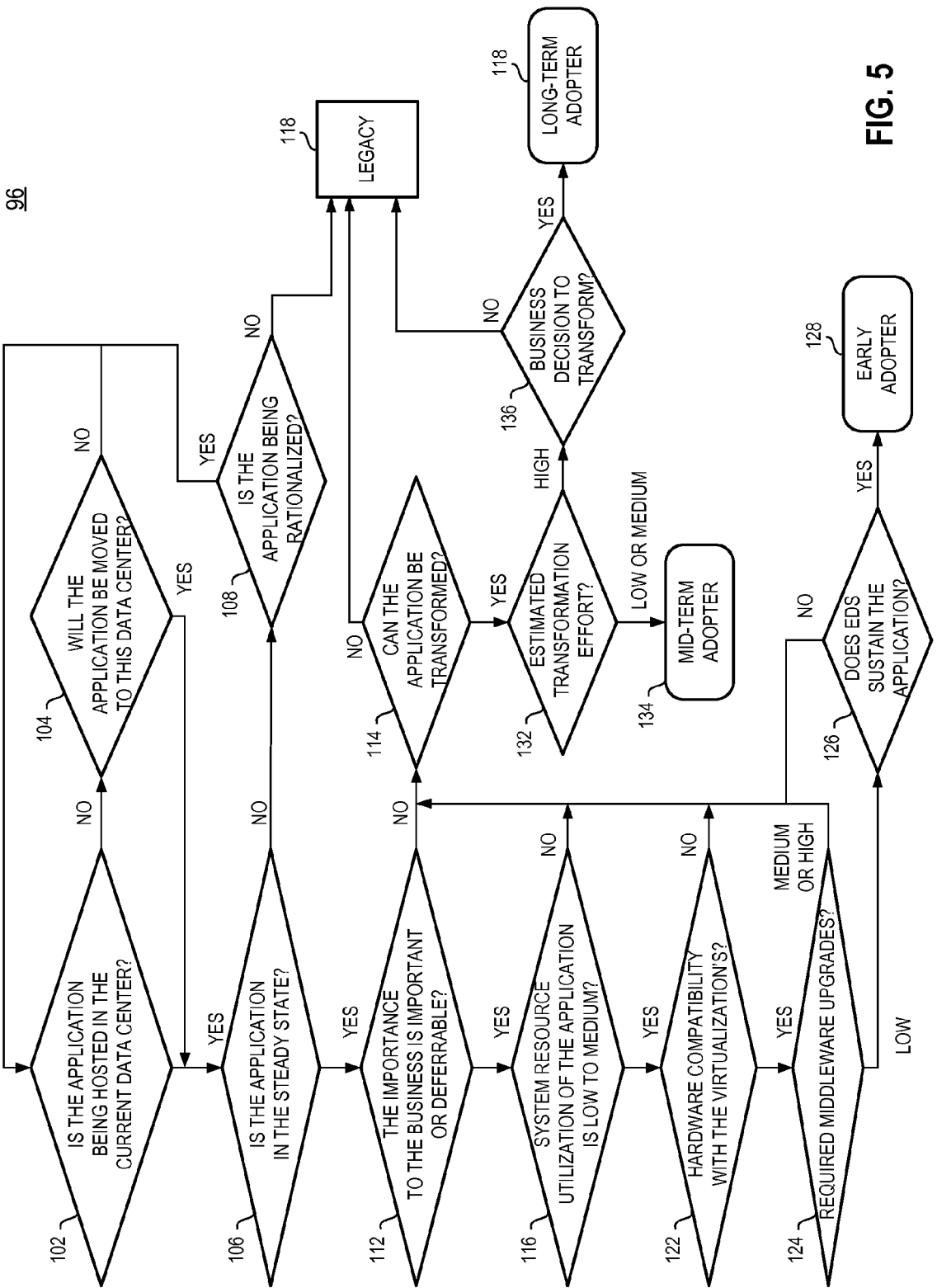
FIG. 5 illustrates a process diagram representative of a decision tree carried out during system assessment.

FIG. 5 illustrates a process representation of an exemplary decision tree 96 of the system assessment 36 shown in FIG. 4. Here, the decision tree provides for a determination of the computer system arrangement as being an early adopter, a mid-term adopter, a long-term adopter, or a legacy-only arrangement. An early adopter arrangement is here considered to be an arrangement in which the effort required to transform the computer system into a virtualized arrangement is relatively low, e.g., requiring only a short period of time, such as two months, to complete the transformation, or the transformation is strategically required and should be carried out as soon as possible. A mid-term adopter is here considered to be a system in which the transformation efforts are of medium efforts requiring, e.g., six months for transformation. A long-term adopter is here considered to be a computer system in which the effort required to transform the arrangement into a virtualized arrangement is large, requiring, e.g., more than one year for the transformation. And, here, a legacy system is a computer system arrangement whose transformation into a virtualized arrangement is not viable, e.g., not economical or does not meet the characteristics of a virtualization environment.

The decision tree commences at the decision block 102 whereat a determination is made as to whether the application being hosted is in the current, that is, existing, data center. If not, the no branch is taken to the decision block 104 whereat a determination is made as to whether the application shall be moved to the data center. If not, the no branch is taken. Otherwise, the yes branches are taken from the decision blocks 102 and 104 to the decision block 106. At the decision block 106, a determination is made as to whether the application is in the steady state. If not, the no branch is taken to the decision block 108. At the decision block 108, a determination is made as to whether the application is being rationalized. If so, the yes branch is taken. The yes branch from the decision block 108, and also, the no branch taken from the decision block 104, extend back to the decision block 102.

If the yes branch is taken from the decision block 106, a path is taken to the decision block 112 whereat a determination is made as to whether the importance to the business is important or deferrable. Depending upon the decision, no branch or yes branch is taken to the decision blocks 114 and 116, respectively. At the decision block 114, a determination is made as to whether the application can be transformed. If not, a no branch is taken to the block 118 and the arrangement is considered to be a legacy arrangement. If a branch, conversely, is taken to the decision block 116, a determination is made as to whether system resource utilization of the application is low-to-medium. If so, the yes branch is taken to the decision block 122 whereat a determination is made as to whether there is hardware compatibility with the virtualization arrangement. If so, the yes branch is taken to the decision block 124 whereat a determination is made regarding the extent of the required middleware upgrades. If the required upgrades are relatively low, the "low" path is taken to the decision block 126 whereat a determination is made as to whether the application is sustained by the converter. If so, the yes branch is taken to the block 128 and a determination is made that the computer system arrangement forms an early adopter arrangement.

No branches taken from any of the decision blocks 112, 116, 122, 124, and 126 extend to the decision block 114. If the determination is made at the decision block 114 that the application can be transformed, the yes branch is taken to the decision block 132. At the decision block 132, a determination is made of the estimated transformation effort. If the estimate is of low or medium effort, a path is taken to the block 134, and the arrangement is determined to be a mid-term adopter. Conversely, if the transformation effort is estimated to be high, a path is taken to the decision block 136, and a determination is made as to whether there is a business decision to transform the computer system arrangement. If so, the yes branch is taken to the block 138, and the arrangement is considered to be a long-term adopter. Otherwise, the no branch is taken to the block 118, and the arrangement is considered to be a legacy arrangement.

Figure 6:
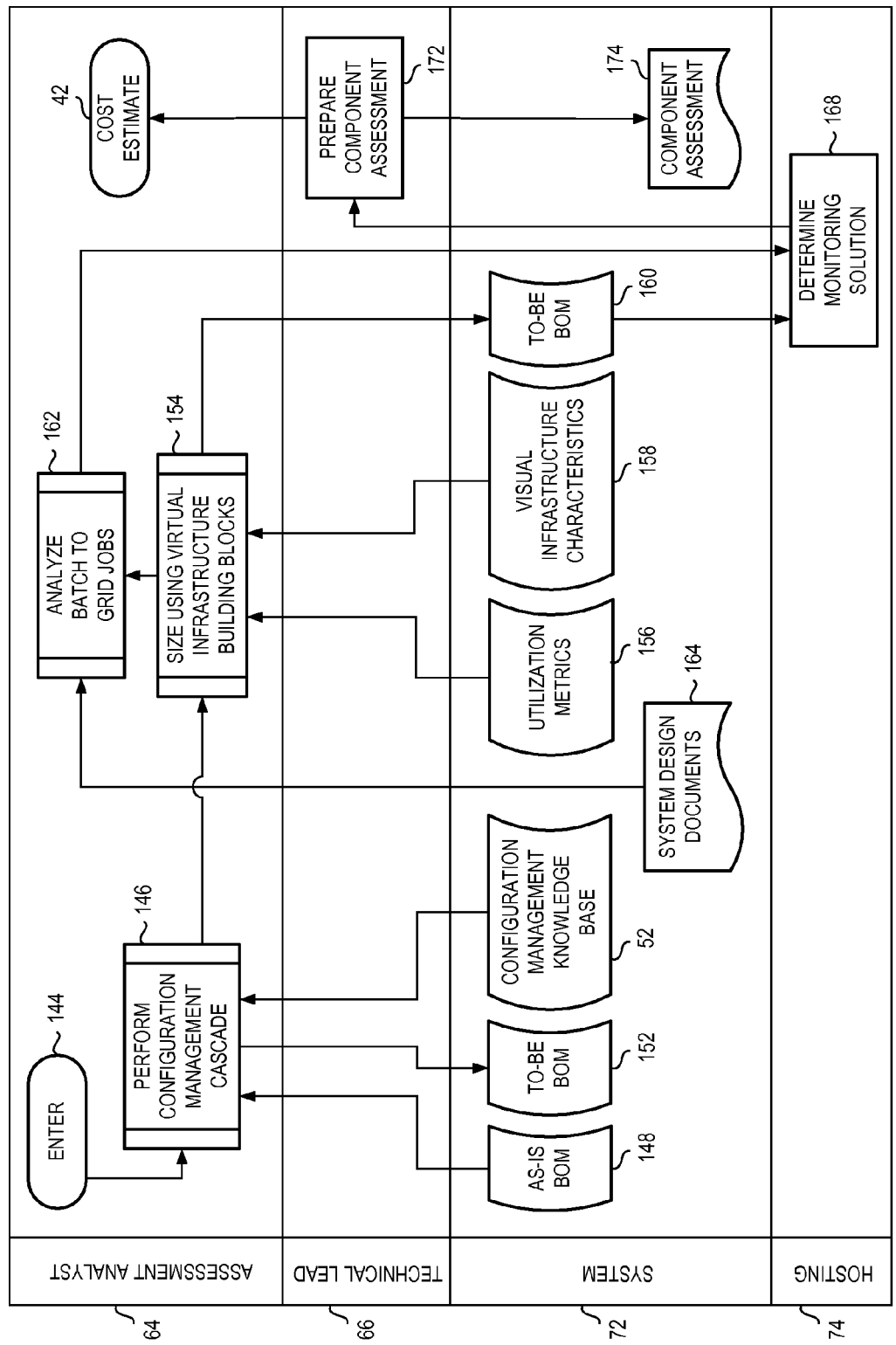
FIG. 6 illustrates a process representation of component assessment performed pursuant to operation of an embodiment of the present invention.

FIG. 6 illustrates the process of the component assessment stage 38 of an embodiment of the present invention. Here, the process is partitioned into stages performable by the assessment analyst 64, the technical lead 66, the system 72, and the hosting 74. Subsequent to entry, indicated by the enter block 144, a configuration management cascade is performed, indicated by the block 146. Input information is provided to the stage 146 by an as-is BOM 148, such as that retrieved by the assessment store 44 (shown in prior figures) and from the configuration management knowledge base 52. A to-be BOM is generated, indicated by the block 152. Thereafter, sizing is performed, indicated at the stage 154 using virtual infrastructure building blocks. Input information provided to the stage 154 is sourced by utilization metrics 156 and virtual infrastructure characteristics 158. Then, and as indicated by the block 162, batch-to-grid jobs are analyzed. Additional input information provided to the stage 162 is sourced by system design documents, indicated at the block 164. In an alternate implementation, the operations of the stages 154 and 162 operate in parallel. That is to say, the stage 162 need not wait for stage 154 to be completed. Rather, the operations are performable concurrently.

Additional to-be BOM listings are provided by the stage 154, here indicated by the block 160.

Subsequent to the analysis at the stage 162, monitoring solutions are determined, indicated by the block 168. Input information from the listing 160 is also provided to the stage 168. And, thereafter, component assessments are prepared, indicated by the stage 172. A component assessment is provided, indicated at the block 174, and a path is taken to the cost assessment stage 42.

In the exemplary implementation, the to-be BOM is not necessarily the actual to-be BOM. The to-be BOM, along with the virtual infrastructure, is used by a hosting vendor to help determine the target hardware, zones, whether sparse or full, and queues within the virtual environment. Virtual infrastructure with projected utilization and jobs suitable for becoming grid jobs are also analyzed.

Figure 7:
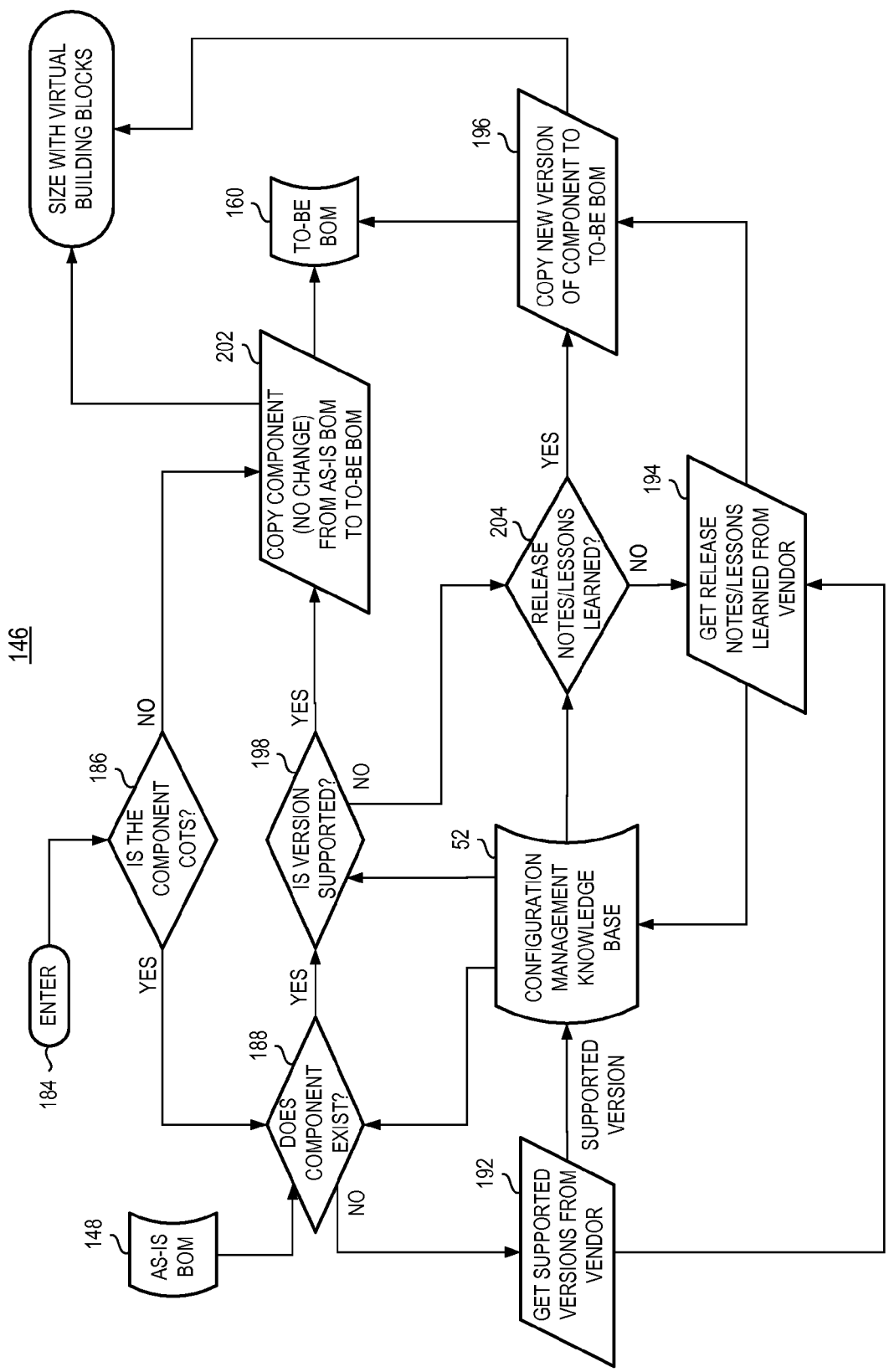
FIG. 7 illustrates a process representation of a configuration management cascade carried out pursuant to operation of an embodiment of the present invention.

FIG. 7 illustrates the configuration management cascade 146 forming a part of the component assessment 38 shown in FIG. 6. First, after entry into the sub-process indicated by the enter block 184, a determination is made as to whether the component is a Commercial Off The Shelf (COTS) product. If so, the yes branch is taken to the decision block 188, and a determination is made as to whether the component exists. Additional input information into the determination is provided by the as-is bill of materials listing 148. If a determination is made that the component does not exist, the no branch is taken to the block 192, and supported versions are obtained from a vendor. The supported version is then provided to the configuration management knowledge base 52. And, a path is taken to the block 194, and release notes/lessons learned notes are obtained from the vendor. And, a path is taken to the stage 196 and a new version of the component is copied to the to-be bill of materials. And, the resultant to-be bill of materials is listed, indicated by the block 160.

If a determination is made at the decision block 188 that the component does exist, the yes branch is taken to the decision block 202, and a determination is made as to whether the version of the component is supported. If so, the yes branch is taken to the stage 202, and the component is copied from an as-is to a to-be indication, without change, and provided to the to-be BOM listing 160. A no branch extending from the decision block 186 also extends to the stage 202.

If a determination is made at the decision block 198 that the version is not supported, the no branch is taken to the decision block 202, and a determination is made as to whether release notes/lessons learned are available. If not, the no branch is taken to the stage 194. Otherwise, the yes branch is taken to the stage 196. Review of the configuration management cascade indicates that information contained in the configuration management knowledge base is used to convert an existing BOM into a new virtual/grid BOM, i.e., the to-be BOM. The configuration management knowledge base is used to leverage whether it is known that certain components, and their versions, are supported in the new environment. Release notes and lessons learned are captured to facilitate estimations developed subsequently in the assessment process.

Figure 8:
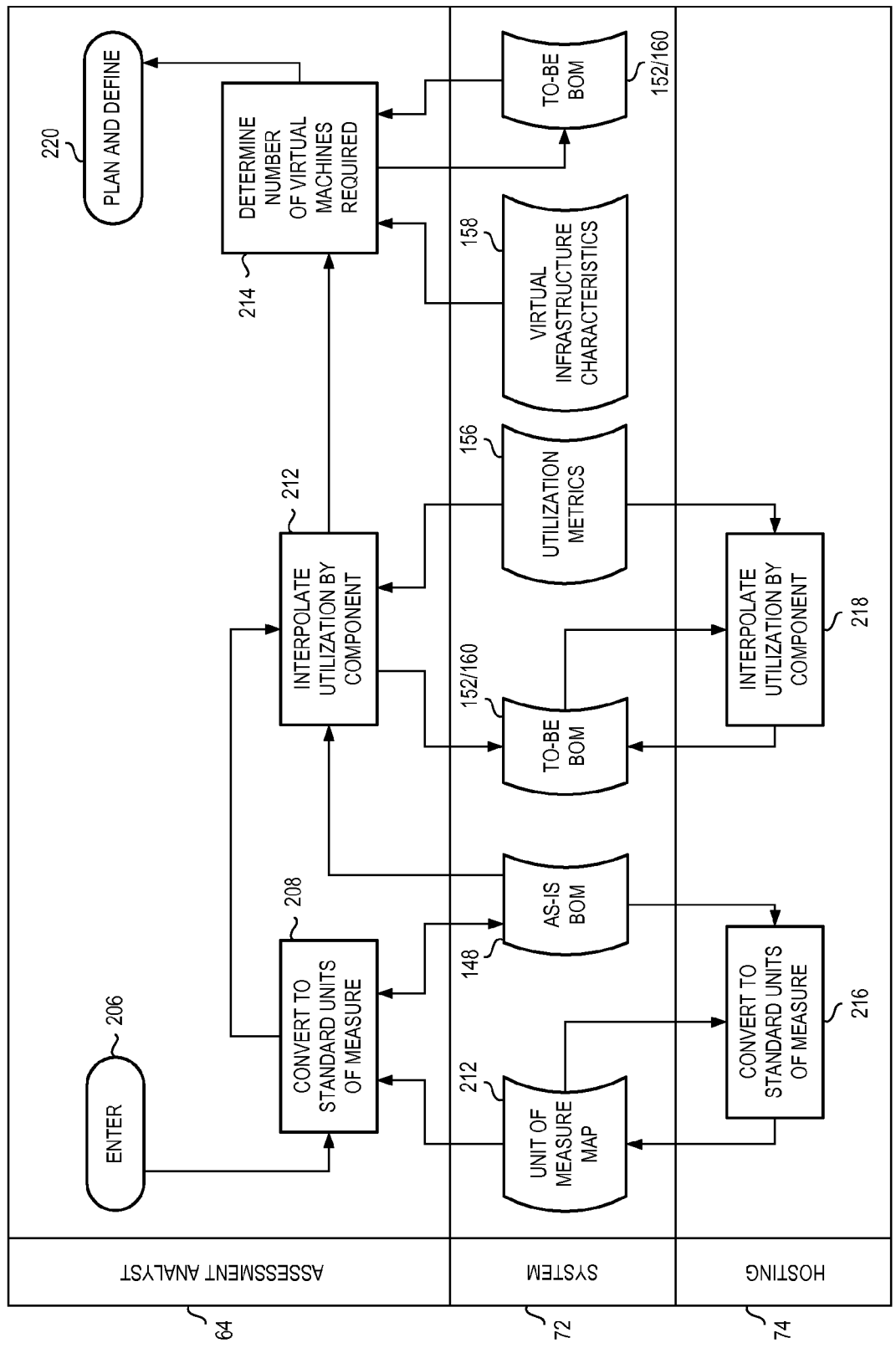
FIG. 8 illustrates a process diagram representative of sizing operations performed pursuant to operation of an embodiment of the present invention.

FIG. 8 illustrates a process representation of the sizing using virtual infrastructure building block stage 154 that forms part of the component assessment stage 38 shown in FIG. 6. Here, also, the process is partitioned to indicate portions carried out by the assessment analyst, the system, and the hosting 64, 72, and 74, respectively.

Subsequent to entry, indicated at the enter block 206, a conversion, indicated at the stage 208, to standard units of measure is carried out. Additional input information provided to the stage 208 is sourced at the unit of measure map 212 and the as-is BOM 148. Then, utilization by component is interpolated, indicated by the block 212. Additional input information provided to the stage 212 is sourced at the as-is BOM 148, the to-be BOM 152/160, and the utilization metrics 156. And, as indicated by the block 214, the number of virtual machines required is determined. Additional input information provided to the stage 214 is sourced by the virtual infrastructure characteristics list 158 and the to-be BOM 152/160. Stage 216 is further shown in the figure, illustrating conversion of as-is BOM input information into standard units of measure for the unit of measure map. And, stage 218 is also shown representing utilization by component interpolation using input information provided by the utilization metrics and listing at the to-be BOM stages 208/216 and 212/218 are carried out at the partition level 62 and 74.

Upon completion of the stage 214, a path is taken to the batch-to-grid job analysis stage 162 (shown in FIG. 6) and, as illustrated in FIG. 8, to a plan and define block 220. The process 154 provides helpful information to a hosting vendor. The resources required for each of the components of the system along with horizontal scaling information is used to place the components of the system into virtual machines. A hosting provider uses this so-called "straw man" configuration information subsequently to determine what resources will be consumed in the virtualization environment.

Figure 9:
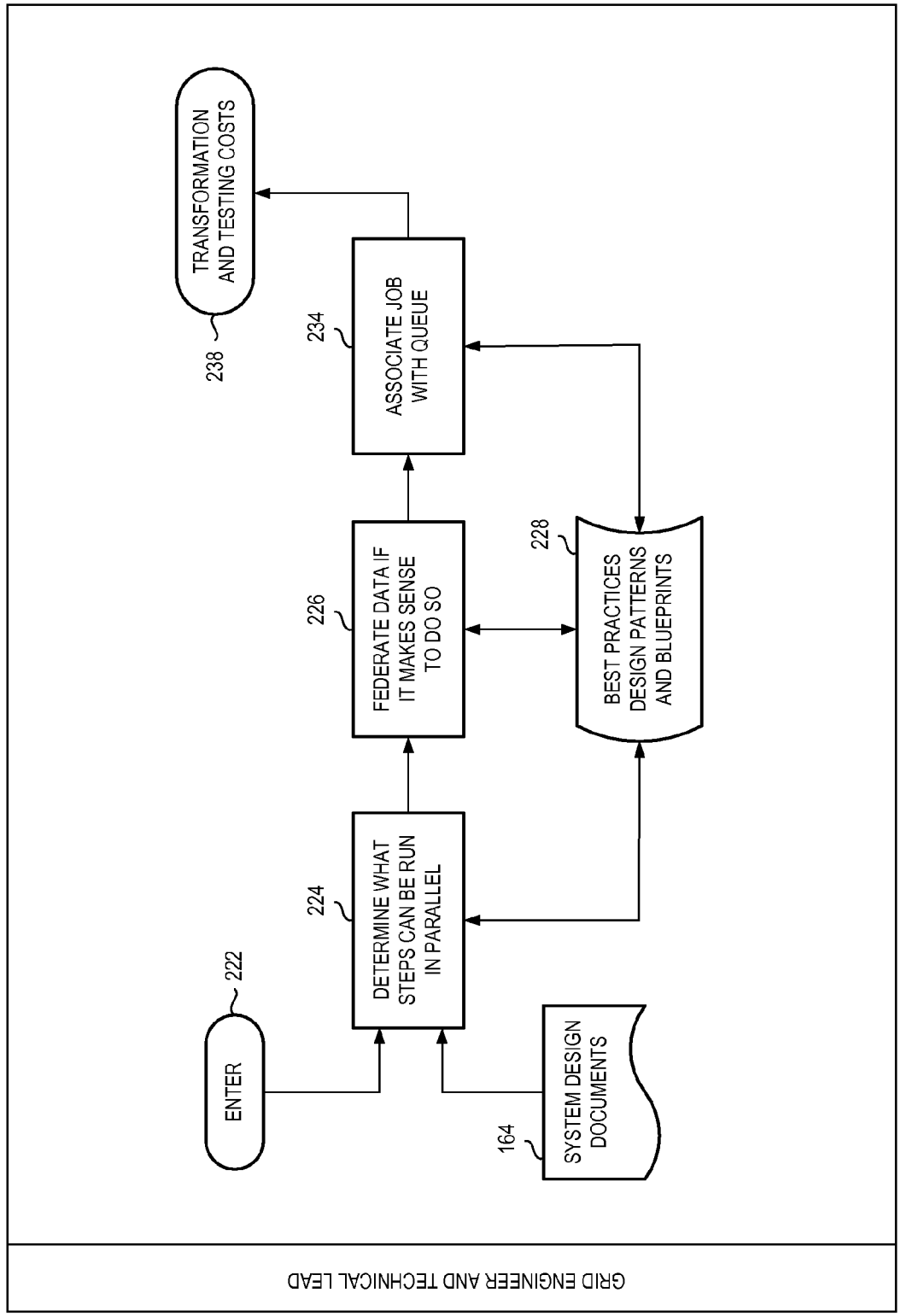
FIG. 9 illustrates a process representation of a batch-to-grid job analysis performed pursuant to operation of an embodiment of the present invention.

FIG. 9 illustrates a process representation of the batch-to-grid jobs analysis stage 162 forming part of the component assessment process 38 shown in FIG. 6. Subsequent to entry indicated by the enter block 222, a determination is made, indicated by the block 224, as to what steps can be run in parallel. Additional input information provided to the stage 24 is sourced at the system design document listing 164. Then, and as indicated at the block 226, the data is federated to determine the viability of such a procedure. Additional information provided to the stage 226 is sourced at a best practices design pattern and blueprints listing 228. And, as indicated by the block 234, a job is associated with an appropriate queue. Additional input information is provided to the stage 234 by the listing 228. Thereafter, and as indicated by the block 238, transformation and testing costs are ascertained.

The process 162 examines jobs that are good candidates for grid computing. Parallelism of the jobs along with their data requirements is analyzed to provide an estimate of the engineering resources necessary to transform the jobs into the grid virtualization arrangement. Certain jobs are more amenable than others for transformation into a grid arrangement. For instance, Omdahl's Law, which examines serial portions of the process and the parallel portions of the process to derive a theoretical speed up, along with an examination of the contention of resources and their latencies are employed to facilitate determination of the advantages of a transformation into a parallel arrangement.

Figure 10:
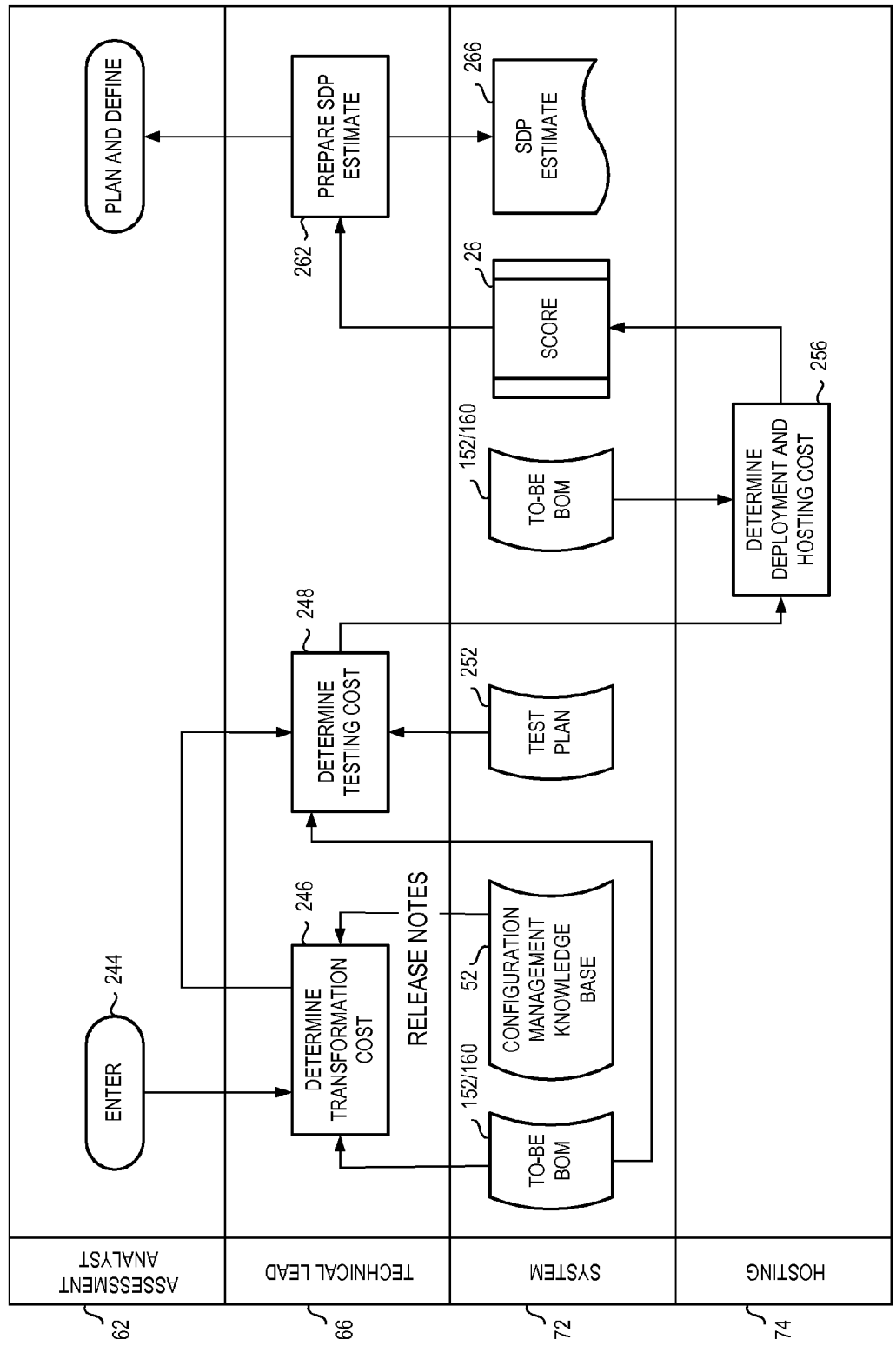
FIG. 10 illustrates a process diagram representative of cost assessment performed pursuant to operation of an embodiment of the present invention.

FIG. 10 illustrates the cost assessment process 42, shown previously in FIG. 3. Again, the process is partitioned into stages performed by the assessment analyst 62, the technical lead 66, the system 72, and the hosting vendor 74.

Subsequent to entry, indicated by the enter block 244, a determination is made, indicated by the block 246, of transformation costs. Additional input information provided to the stage 246 is sourced at the to-be BOM 152/160 and the configuration management knowledge base 52. Release notes, e.g., are provided by the knowledge base 52 to the stage 246. Then, and as indicated by the block 248, testing costs are determined. Additional input information, sourced by the to-be bill of material 152/160 and of a test plan listing 252 is provided to the stage 248.

Thereafter, deployment and hosting costs are determined, indicated by the block 256. Input information sourced at the to-be BOM 152/160 is also provided to the stage 256. Scoring is provided by the scoring quantizer 26, and thereafter, an SDP estimate is prepared, indicated by the block 262. An SDP estimate listing is generated, indicated by the block 266, and the score cost estimate is provided to the plan and define stage 262.

Thereby, the cost assessment process takes the information garnered from earlier activity to provide SDP estimates of transformation requirements to transform the existing computer system arrangement into the virtualized arrangement. Transformation costs, testing costs, deployment and hosting costs, e.g., are computed. This information is provided to the scorer to help prioritize the transformation activity. A technical lead is the same technical lead identified at the commencement of the assessment process. The technical lead coordinates the collection of the costing information. The process is repeatable, with changeable parameters permitting analysis of altered results responsive to altered parameters and assumptions, while providing for a quantifiable score that is repeatable and amenable for analysis pursuant to a decision as to whether to transform an existing computer system arrangement into a virtualized arrangement.

The previous descriptions are of preferred examples for implementing the invention, and the scope of the invention should not necessarily be limited by this description. The scope of the present invention is defined by the following claims.

What is claimed is:

1. Apparatus for facilitating transformation of an existing computer system arrangement into a virtualized computer system arrangement, said apparatus comprising:
    an assessment store;
    an assessor adapted to receive indication of the existing computer system arrangement from the assessment store, said assessor configured to assess viability of the transformation into the virtualized computer system arrangement; and
    a score quantizer adapted to receive indication of assessment made by said assessor, said quantizer configured to form a quantized score representative of the assessment, the quantized score usable in selection of whether to transform the existing computer system arrangement into the virtualized computer system arrangement
    wherein said assessor comprises a cascaded arrangement of a system assessor, a component assessor, and a cost assessor, wherein a system assessment is made by said system assessor and provided to said component assessor, and a component assessment is made by said component assessor and provided to said cost assessor.

2. The apparatus of claim 1 wherein said system assessor is configured to assess transformation effort expected to be required to transform the existing computer system arrangement to the virtualized computer system arrangement.

3. The apparatus of claim 1 wherein said component assessor is configured to assess component capabilities required to transform the existing computer system arrangement to the virtualized computer system arrangement.

4. The apparatus of claim 1 wherein said cost assessor is configured to assess costs required to transform the existing computer system arrangement to the virtualized computer system arrangement.

5. The apparatus of claim 1 wherein the virtualized computer system arrangement comprises a horizontally scaled arrangement and wherein said assessor is configured to assess viability of the transformation into the horizontally scaled arrangement.

6. The apparatus of claim 1 wherein the virtualized computer system arrangement comprises a grid arrangement and wherein said assessor is configured to assess viability of the transformation into the grid arrangement.

7. The apparatus of claim 1 wherein the quantized score formed by said score quantizer is based upon the system assessment, the component assessment, and the cost assessment.

8. The apparatus of claim 1 further comprising an optimizer adapted to receive an indication of the assessment made by said assessor, said optimizer positioned in a feedback arrangement with said assessor, said optimizer configured to provide feedback information to said assessor.

9. The apparatus of claim 1 wherein said assessor further maintains knowledge base information and wherein assessment made by said assessor is, in part, responsive to comparison of the indication of the existing computer system arrangement with the knowledge base information.

10. The apparatus of claim 1 wherein said assessor is further configured to generate a listing of an expected bill-of-materials of the virtualized computing system arrangement.

11. A method for facilitating transformation of an existing computer system arrangement into a virtualized computer system arrangement, said method comprising the operations of:
    assessing viability of the transformation into the virtualized computer system arrangement responsive to indication of the existing computer system arrangement by providing a system assessment made by a system assessor to a component assessor and providing a component assessment made by said component assessor to a cost assessor; and
    forming a quantized score representative of assessment, made during said operation of assessing, the quantized score usable in selection of whether to transform the existing computer system arrangement into the virtualized computer system arrangement;
    wherein assessing comprises utilizing information sourced from an assessment store and storing information to the assessment store.

12. The method of claim 11 wherein said operation of assessing comprises assessing transformation effort expected to be required to transform the existing computer system arrangement to the virtualized computer system arrangement.

13. The method of claim 11 wherein said operation of assessing comprises assessing component capabilities required to transform the existing computer system arrangement to the virtualized computer system arrangement.

14. The method of claim 11 wherein said operation of assessing comprises assessing costs required to transform the existing computer system arrangement to the virtualized computer system arrangement.

15. The method of claim 11 wherein the virtualized computer system arrangement comprises a horizontally scaled arrangement and wherein said operation of assessing comprises assessing viability of the transformation into the horizontally scaled arrangement.

16. The method of claim 11 wherein the virtualized computer system arrangement comprises a grid arrangement and wherein said operation of assessing comprises assessing viability of the transformation into the grid arrangement.

17. The method of claim 11 further comprising the operation of selecting whether to transform the existing computer system arrangement into the virtualized computer system arrangement.

18. The method of claim 11 further comprising the operation of providing the indication of the existing computer system arrangement.

19. The method of claim 11 wherein the system assessor, the component assessor, and the cost assessor are organized in a cascaded arrangement.

\* \* \* \* \*

UNITED STATES PATENT AND TRADEMARK OFFICE
CERTIFICATE OF CORRECTION

| | | |
|---|---|---|
| PATENT NO. | : 7,937,356 B2 | Page 1 of 1 |
| APPLICATION NO. | : 11/560389 | |
| DATED | : May 3, 2011 | |
| INVENTOR(S) | : Yea-Yuan Beth Van Egeren et al. | |

It is certified that error appears in the above-identified patent and that said Letters Patent is hereby corrected as shown below:

In column 10, line 40, in Claim 1, delete "arrangement" and insert -- arrangement; --, therefor.

Signed and Sealed this
Twenty-fifth Day of October, 2011

David J. Kappos
*Director of the United States Patent and Trademark Office*